Patented Nov. 12, 1935

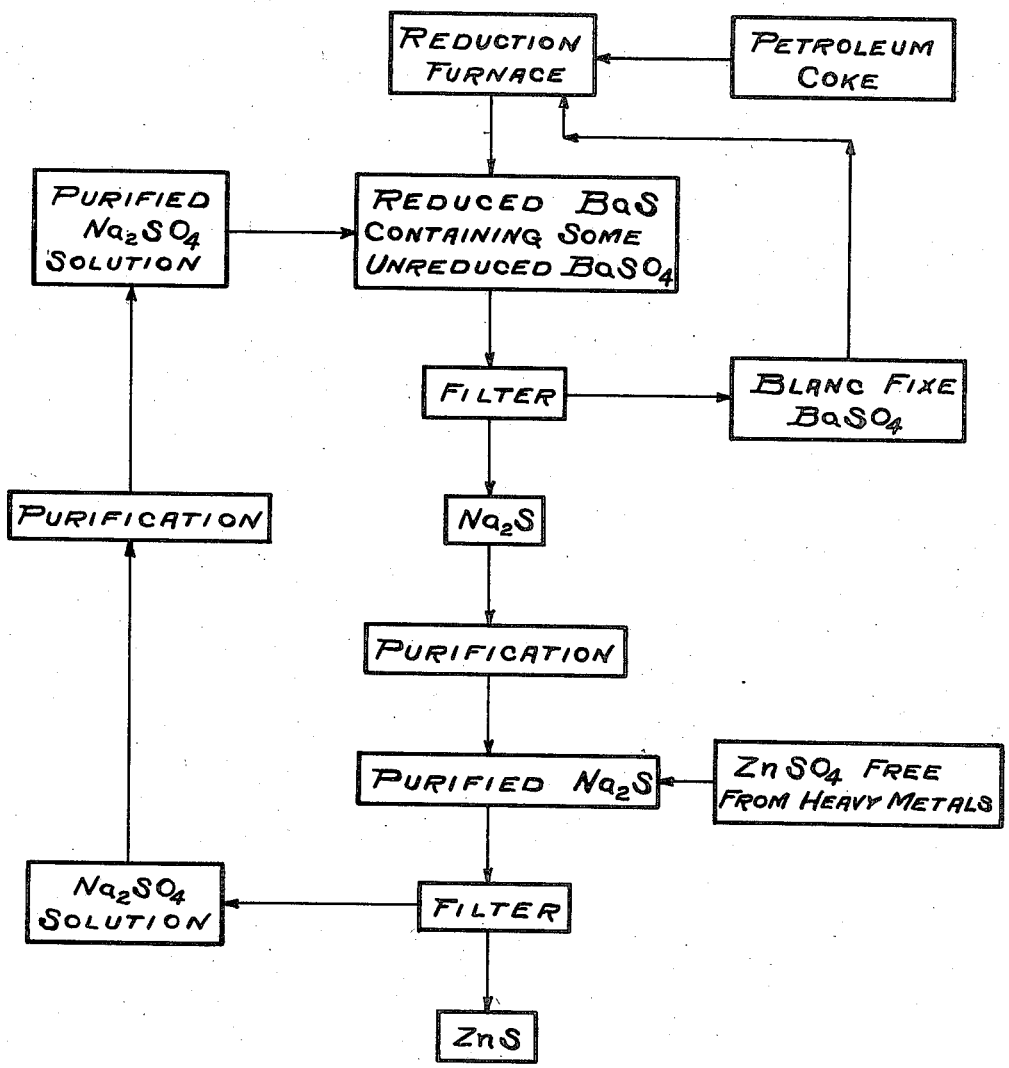

2,020,323

UNITED STATES PATENT OFFICE 2,020,323

METHOD OF MAKING ZINC AND SODIUM SULPHIDES

Thomas A. Mitchell and Royal L. Sessions, Denver, Colo., assignors, by mesne assignments, to Hughes-Mitchell Processes Incorporated, Denver, Colo., a corporation of Wyoming Application February 18, 1932, Serial No. 593,930

13 Claims. (Cl. 23—135)

This invention relates to the manufacture of zinc sulphide, and more particularly to an economical and cyclic process for making zinc sulphide from zinc sulphate, which is substantially free from the heavy metals, and preventing the introduction of undesired impurities into the system.

The standard methods of making zinc sulphide have involved precipitating it from a zinc chloride or a zinc sulphate solution by means of the sulphide of barium or sodium. The use of zinc chloride presents various problems, both in its manufacture and in its use in the production of a pigment, while zinc sulphate may be easily obtained in a satisfactory state of purity for its use. Hence, it is desirable to use the sulphate instead of the chloride as the reagent and to precipitate the zinc sulphide by means of a sodium sulphide solution.

It has been proposed heretofore to produce the sodium sulphide from sodium sulphate, by reduction in a furnace. The sodium sulphate may in turn be derived from the reaction involving precipitating the zinc sulphide from its sulphate solution by means of sodium sulphide; but the solution must be evaporated to dryness before it can be reduced in the furnace. Also, after the sodium sulphide has been produced, it must be crystallized from its solution by a slow evaporating process. These steps of evaporation, reduction and crystallization are expensive and involve the introduction of impurities, and they present various difficulties in the production of a satisfactory grade of sodium sulphide, such as is required for making a pigment. For example, sodium sulphide as thus made is ordinarily found contaminated with iron which is present as a double sulphide of iron and sodium, and steps must be taken to eliminate such heavy metal impurities.

In accordance with one aspect of this invention, we propose to derive both the zinc and the sulphur atoms of the zinc sulphide from zinc sulphate. We propose also to utilize barium sulphide as an intermediate reagent for the production of the sodium sulphide required in the process and to make the desired zinc sulphide by a cyclic process, which we term the "barium sulphate-sodium sulphide cycle", as represented in the following equations:

1. 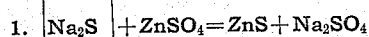
2. 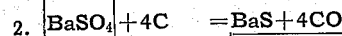
3. 

As shown by these equations, sodium sulphide and barium sulphate are cyclically used in the series of reactions to generate first the intermediate reagent, barium sulphide, and then the primary reagent, sodium sulphide. The sodium sulphide is used as the precipitating agent, and the resultant sodium sulphate solution is regenerated to sodium sulphide by reaction with barium sulphide, the latter in turn being produced by reduction of the barium sulphate produced in the third equation above noted.

It will, therefore, be apparent that one object of this invention is to employ a cyclic process of making zinc sulphide from zinc sulphate, in which both the sulphur and the zinc atoms are derived therefrom.

It is a further object of this invention to provide a method of making sodium sulphide, and particularly a solution of high concentration, which must be carried on cyclically in connection with the process of making zinc sulphide.

With these and other objects in view, as will be apparent to one skilled in this art, this invention resides in the combination of process steps illustrated in the accompanying drawing as a flow diagram, which is described in the specification and covered by the claims appended hereto. In order that the invention may be fully understood in all of its aspects, our preferred method of deriving zinc sulphide from a zinc sulphate solution will be set forth.

Zinc sulphate derived from various sources may be employed in this process, but it is desirable that the solution being treated is substantially free from the heavy metal impurities, and particularly iron, manganese, cadmium, copper and lead. If the zinc sulphate contains compounds of such metals, various purification steps will be employed to remove them.

For example, we may treat the solution with sufficient potassium permanganate and zinc oxide to oxidize to the ferric condition such ferrous iron as is present and thus precipitate it as a hydrate. This also serves to remove as manganese dioxide any manganous compounds derived from impurities in the solution and from the permanganate which is introduced as a reagent. The solution, after filtering, may now be passed over zinc dust to remove other heavy metals, such as copper and lead, compounds of which may be present in the solution. It is also desirable that suitable precautions be taken to avoid introducing impurities, such as by not using iron pipe lines for carrying the solutions. Since this solution of zinc sulphate serves as the source of both the zinc and the sulphur atoms for the final product, and no other outside materials are introduced into the cyclic process, the presence of impurities is thus largely avoided.

The precipitating reagent is sodium sulphide. Its sulphur atom is derived indirectly from barium sulphate, which in turn is produced as an intermediate product in this cyclic series of steps.

The barium sulphate is reduced to barium sulphide by being heated with carbon in a furnace. This dry barium sulphide is combined with a concentrated solution of sodium sulphate to form barium sulphate as a precipitate and the desired sodium sulphide solution.

The furnacing step is preferably so carried on as to avoid introduction of iron into the system. Coal often contains iron as an impurity; hence, we prefer to employ a reducer which is found to be as free as possible from iron, such as a high grade petroleum coke. By using this material in substantially the theoretical ratio required for reducing barium sulphate and by employing an outside source of heat, such as natural gas or other suitable heating medium, we thus avoid introducing impurities into the reduction process. The furnacing operation may be carried on otherwise in accordance with standard practice, which involves heating the barium sulphate and carbon for a few hours at a temperature of about 1800° F. at which the carbon removes the oxygen from the barium sulphate molecule. The product is known as "black ash" and consists of barium sulphide, carbon intermingled with unreduced barium sulphate. The product contains only a very little carbon, which is contrary to the common practice.

It has heretofore been customary to leach the black ash with water, in order to make a solution of barium sulphide. A cold saturated solution of barium sulphide has a strength of only about 12° to 14° Beaumé, whereas the zinc salts employed in the process may be used as high as 50° Bé. The volume of the zinc salt solution is approximately one to six volumes of the barium sulphide reagent solution. When the barium sulphide solution is added to the sodium sulphate solution in order to form sodium sulphide and barium sulphate, this means that two volumes of solutions are added together and that the resultant sodium sulphide solution is in a very dilute condition. It is therefore seen that such a procedure requires considerable evaporation of the solutions to obtain the proper concentrations.

In accordance with one phase of this invention, we avoid the objectionable features of the above procedure. To this end, we leach the black ash directly with a sodium sulphate solution rather than with water. We prefer to use a strong or a concentrated solution of sodium sulphate and preferably the solution derived directly from the precipitation of zinc sulphide, which is obtained by filter-pressing the precipitate. This direct operation results in leaving the barium sulphate as a precipitate intermingled with the black ash, and the sodium sulphide solution is obtained without going through intermediate dilution steps. In this way, we are able to make up a sodium sulphide solution of 30° Beaumé or stronger, which is over twice the concentration of the barium sulphide solution employed in accordance with the procedure above outlined. Since this barium sulphate precipitate remains mixed with the black ash, then there is little loss of material involved in refurnacing the residue along with the recovered BaSO₄, together with a proper mixture of iron-free carbon, as will be readily understood. This residue cannot be again furnaced in the ordinary practice, because the barytes and coal introduce a comparatively large amount of gangue which must be discarded; whereas our cyclic process prevents the introduction of such materials.

A solution of barium sulphide in water hydrolyzes and dissociates with the formation of barium hydrate and sulphydrate. This solution tends to oxidize when held in storage with the formation of an excess of barium hydrate, thus unbalancing the theoretical ratio of the hydrate and sulphydrate and leaving an excess of hydroxyl ion which enters into the subsequent reactions. In the present case, the sodium sulphide is formed directly from the black ash and the barium sulphide is not allowed to remain in solution. Hence, the danger of the sodium sulphide solution being contaminated with hydroxyl ions from this source is minimized.

It will be appreciated that we thus employ commercially pure solutions of sodium sulphide and zinc sulphate, both of which may be further purified if desired, so that by mixing these two solutions a precipitate of zinc sulphide will be formed, which is satisfactory for use as a pigment. In this process, barium has served as a cyclic carrier of sulphur for the process and the zinc sulphate has furnished both the sulphur and the zinc for the final product. It is to be particularly noted that the sodium sulphate solution may be filter-pressed from the zinc sulphide, purified if necessary, and returned to process as a strong leaching solution to be applied to the dry barium sulphide black ash. In this way, any dilution of the solution is avoided, and the evaporation of water required by the prior methods has been decreased about 85% or equivalent to the large amount of water heretofore added to the black ash for dissolving the barium sulphide therein. This elimination of an expensive evaporating procedure results from our use of the sodium sulphate solution in place of plain water for leaching the black ash. Likewise, the sodium sulphide solution, as produced by this process, is kept full strength, so that it is now possible to employ solutions of high concentration throughout the process.

We may modify the process, as regards the treatment of the black ash, by mixing the required amount of powdered or finely divided carbon, or petroleum coke, with the black ash prior to the step of leaching it with the sodium sulphate solution to form the sodium sulphide and barium sulphate, so that the mixture will be ready and correctly proportioned for the furnacing operation, after the leaching has been accomplished. By using this order of steps, we avoid the necessity for grinding the black ash and then mixing the coke therewith, as has been required heretofore for preparing the black ash residue, after the water leaching operation, for re-furnacing. Also, the addition of the coke to the black ash pulp and its thorough mixing therewith makes the material more easily permeated by the leaching solution of sodium sulphate. Blanc fixé, precipitated cold, presents filtering difficulties, but the material is rendered open and porous in structure so that filtration is readily accomplished. The solution is removed from the black ash by means of a filter press, thereby avoiding dilution of the sodium sulphide.

The zinc sulphide may be conditioned as desired, either before or after it is calcined, in accordance with standard practice, and its alkalinity may be suitably controlled to make the material readily dispersable in oil. Various procedures may be adopted for the purpose of making a suitable pigment therefrom.

Having thus described our invention, what we claim as new and desire to secure by Letters Patent is:

1. The method of making zinc sulphide by the reaction of sodium sulphide and zinc sulphate in solution comprising the steps of removing the resultant sodium sulphate from the zinc sulphide precipitate and treating solid barium sulphide therewith to form the required sodium sulphide for use in the process.

2. The method of claim 1 in which the sodium sulphate solution is separated from the zinc sulphide precipitate without dilution and the reaction with the barium sulphide results in a solution of sodium sulphide of high strength, and in which the zinc sulphate is used in a high concentration in the step of precipitating the zinc sulphide.

3. The method of claim 1 in which the barium sulphide is present in a furnace charge resulting from the reduction of barium sulphate, and in which the furnace charge is leached directly with the sodium sulphate solution, whereby barium sulphate is precipitated within the furnace charge and a sodium sulphide solution is recovered therefrom.

4. The method of making zinc sulphide comprising the steps of treating zinc sulphate in solution with sodium sulphide, separating the resultant sodium sulphate solution from the zinc sulphide precipitate and combining it directly with solid barium sulphide to form barium sulphate and the required sodium sulphide reagent for use in the process, and reducing the barium sulphate precipitate to barium sulphide for reaction with a further amount of sodium sulphate in solution, whereby the zinc sulphate of required purity serves to provide both elements of the zinc sulphide and the introduction of impurities into the system is controlled.

5. The method of claim 4 in which the barium sulphate is heated with carbon in a furnace to form barium sulphide, and the furnace charge containing the barium sulphide is leached with the sodium sulphate solution and barium sulphate is precipitated within the charge, and the barium sulphate in the furnace charge is thereafter again reduced to the sulphide, whereby barium may be used cyclically in the production of sodium sulphide.

6. The method of making zinc sulphide comprising the steps of providing a solution of zinc sulphate which is substantially free from the heavy metals, precipitating zinc sulphide from said solution by means of sodium sulphide in solution, separating the resultant sodium sulphate solution therefrom, leaching a furnace charge of black ash by means of the sodium sulphate solution to precipitate barium sulphate therein and form a solution of sodium sulphide for use in forming zinc sulphide and refurnacing the charge with more carbon to form more barium sulphide for further treatment with the sodium sulphate solution, whereby both the zinc and the sulphur of the zinc sulphide are derived from the purified zinc sulphate solution.

7. The method of claim 6 in which the sodium sulphate solution formed by precipitation of the zinc sulphide from a strong zinc sulphate solution is separated from the precipitate without dilution and is thus employed to leach the black ash, whereby a strong solution of sodium sulphide is obtained for reaction with the zinc sulphate.

8. The method of making zinc sulphide by precipitation from a zinc sulphate solution comprising the steps of treating dry black ash containing barium sulphide with a strong solution of sodium sulphate and precipitating barium sulphate within the black ash while forming a strong solution of sodium sulphide, separating the solution from the black ash without dilution, heating the black ash intermixed with iron free carbon to form more barium sulphide for further treatment with sodium sulphate without introducing undesired impurities, and combining the undiluted sodium sulphide solution with a purified zinc sulphate solution of required high strength to precipitate zinc sulphide therefrom and reform a strong solution of sodium sulphate for cyclic use in the process.

9. The method of claim 1 in which the resultant barium sulphate is heated with carbon intermixed therewith to produce further barium sulphide for cyclic production of the sodium sulphide, whereby the introduction of impurities into the system is minimized.

10. The method of claim 1 in which a furnace charge containing the barium sulphide is directly leached with the sodium sulphate solution, and the leached residue containing the resultant barium sulphate is mixed with carbon of high purity and reheated to form barium sulphide for cyclically producing more sodium sulphide by said leaching operation.

11. The method of claim 4 in which a zinc sulphate solution which is substantially free of iron is used and the barium sulphate is reduced by heating it in intermixture with petroleum coke of low iron content, so that the introduction of iron into the closed cycle of reactions is minimized.

12. The method of making zinc sulphide which comprises the initial production of sodium sulphide and barium sulphate by the reaction of barium sulphide and sodium sulphate and treating zinc sulphate in solution with said sodium sulphide to form zinc sulphide and sodium sulphate in solution characterized by the steps of heating the barium sulphate with carbon to reduce it to barium sulphide and leaching the dry furnace charge containing the barium sulphide with the solution of sodium sulphate and thereby producing a solution of sodium sulphide for use in the process.

13. The cyclic method of making zinc sulphide comprising the steps of heating barium sulphate with carbon to form black ash containing barium sulphide, leaching the black ash with a solution of sodium sulphate and thereby precipitating barium sulphate within the charge and forming a solution of sodium sulphide, removing the solution and treating zinc sulphate therewith to precipitate zinc sulphide and leave sodium sulphate in solution, reheating the leached black ash in intermixture with more carbon to produce more barium sulphide for the process, and leaching the black ash with the sodium sulphate obtained from the step of precipitating the zinc sulphide, whereby sulphide sulphur is continually derived within the system from the barium compounds.

THOMAS A. MITCHELL.
ROYAL L. SESSIONS.